United States Patent [19]

Clark

[11] Patent Number: 5,353,994
[45] Date of Patent: Oct. 11, 1994

[54] DISPENSER FOR FLAVORING FOOD PRODUCTS

[76] Inventor: Gordon A. Clark, Ivydene, Burnt Yates, Harrogate, Great Britain

[21] Appl. No.: 31,169

[22] Filed: Mar. 12, 1993

Related U.S. Application Data

[63] Continuation-in-part of Ser. No. 923,419, Jul. 31, 1992, Pat. No. 5,287,801.

[51] Int. Cl.⁵ ...................... B05B 5/04; E01C 19/20
[52] U.S. Cl. .................... 239/700; 239/690; 239/675; 239/676; 239/689; 222/238; 99/451; 118/621
[58] Field of Search .............. 239/672, 675, 676, 679, 239/689, 690, 700; 222/252, 238; 99/451; 118/621

[56] References Cited

U.S. PATENT DOCUMENTS

| | | | |
|---|---|---|---|
| 1,464,621 | 8/1923 | Kemp | 239/675 |
| 1,539,737 | 5/1925 | Hester | 239/675 |
| 3,443,763 | 5/1969 | Wolford | 239/679 |
| 4,196,221 | 4/1980 | Dew | 99/451 |
| 4,303,202 | 12/1981 | Hanford | 239/675 |
| 4,608,261 | 8/1986 | MacKenzie | 99/451 |
| 4,614,162 | 9/1986 | Ryan | 118/19 |
| 4,984,514 | 1/1991 | Van Lengerich | 99/451 |
| 4,986,475 | 1/1991 | Spadafora et al. | 239/215 |

FOREIGN PATENT DOCUMENTS

| | | | |
|---|---|---|---|
| 634688 | 1/1962 | Canada | 239/675 |
| 1454204 | 2/1964 | Fed. Rep. of Germany | . |
| 7206892 | 11/1973 | Netherlands | A22C 7/00 |
| 1005939 | 3/1983 | U.S.S.R. | 239/690 |
| 1561948 | 5/1990 | U.S.S.R. | 99/451 |
| 1676490 | 9/1991 | U.S.S.R. | 239/675 |

Primary Examiner—Andres Kashnikow
Assistant Examiner—Christopher G. Trainor
Attorney, Agent, or Firm—Darby & Darby

[57] ABSTRACT

A foodstuff flavoring apparatus includes a screw conveyor for transporting flavoring axially thereof. A downwardly directed outlet is located in the region of the outlet end of the screw conveyor. An independently driven rotor unit is located below the outlet of the conveyor and is supported from the housing of the screw conveyor unit by a rotatable transfer conduit through which flavouring, which is discharged from the outlet end of the screw conveyor, is delivered to the interior of the rotor housing and which is dispensed by the rotor toward a foodstuff. The rotor is driven by an independent variable-speed drive motor. An electrostatic charging head is located near the rotor housing in the path of the flavouring being dispensed therefrom for facilitating adhesion of the flavouring to the foodstuff. The orientation of the rotor relative to the screw conveyor is adjustable in a range of 360 degrees by rotation of the transfer conduit and is further rotatably adjustable about the axis of the screw conveyor.

20 Claims, 5 Drawing Sheets

DISPENSER FOR FLAVORING FOOD PRODUCTS

This is a continuation-in-part of Ser. No. 07/923,419, filed Jul. 31, 1992, for Method of Flavouring Food Products, now U.S. Pat. No. 5,287,801.

BACKGROUND OF THE INVENTION

This invention relates to a method of flavoring food products. The invention also relates to apparatus for use in performance of the method.

Snack foods and other food products are manufactured in enormous quantities: Flavoring compounds are usually provided in extremely concentrated form and require homogeneous dilute application to avoid adverse consumer reaction. Conventional manufacturing processes have involved application of powdered flavoring using a screw conveyor or vibrating doctor. Such arrangements do not achieve homogeneous distribution of the flavoring. It has often been necessary to dilute the flavoring with a carrier such as flour to reduce the incidence of agglomerations. Adherence of the flavoring whether or not in the presence of a carrier, to the foodstuff is poor. Deposits of concentrated flavoring accumulate on the apparatus and must be removed regularly. This is both wasteful and time consuming.

The problem of poor adhesion is particularly significant in automatic weighing machines which are used for packaging snack foods and like products. These machines which operate at high speeds become inaccurate when deposits of flavoring occur. It has been necessary to stop production so that weighing machines can be cleaned manually on an hourly basis. Furthermore the powdered flavoring has been found to occlude the seals of bags into which the products are placed. This reduces shelf life. Moreover the powdered flavoring forms airborne dust which contaminates adjacent apparatus and is unpleasant for personnel.

Electrostatic powder deposition apparatus is well established, for example for polymer coatings. Despite the problems mentioned above, electrostatic flavoring applicators have not generally been used. Previous proposals have involved use of an airborne flow of charged flavoring. This has the drawback of increasing airborne contamination in the vicinity of the apparatus, particularly when applied to hot foodstuffs, for example when freshly emergent from a fire when convection currents may occur.

SUMMARY OF THE INVENTION

According to a first aspect of the present invention a foodstuffs flavoring dispenser comprises an inlet, a screw conveyor arranged to convey flavoring from the inlet to a rotor disposed in a cylindrical chamber parallel to the axis of the screw conveyor, the rotor including one or more blades extending towards the wall of the chamber, the chamber including one or more apertures through which powdered flavoring carried to the chamber from the inlet by rotation of the screw conveyor is ejected in use of the dispenser by rotation of the rotor.

According to a second aspect of the present invention a method of flavoring a food product comprises the steps of introducing a powdered flavoring to a dispenser including an inlet, a screw conveyor, a rotor disposed in a cylindrical chamber having an axis parallel to the axis of the screw conveyor, the rotor including one or more blades extending towards the wall of the chamber, the chamber including one or more apertures through which powdered flavoring carried to the chamber from the inlet by the screw conveyor is ejected by rotation of the rotor, allowing the flavoring to pass from the apertures adjacent an electrostatic charging head to induce an electric charge thereon, and allowing the charged flavoring to contact the food product.

The cylindrical chamber may be coaxial with the screw conveyor. Alternatively the outlet of the conveyor may include an axially extending aperture remote from the inlet, the chamber being disposed in parallel juxtaposition to the aperture, the chamber having an outlet arranged so that powdered flavoring passing from the aperture is ejected from the outlet by rotation of the rotor. The rotor may be coupled to the screw conveyor and arranged to be driven by rotation of the conveyor.

In a preferred embodiment, particularly wherein the chamber is coaxial with the conveyor, the rotor may be integral with the screw conveyor. Alternatively the rotor may be engaged to the conveyor by a linkage such as a chain, intermeshing gears or a friction drive, for example a belt.

Alternatively, the rotor may be driven independently for example by an air motor or other motor.

In a further preferred embodiment a plurality of rotors may be provided, a first rotor being integral with the screw conveyor and a second rotor being disposed below and in parallel juxtaposition to the first rotor. The first rotor serves to distribute flavoring to the second rotor and the latter can run at a higher speed to ensure efficient distribution of the flavoring. The second rotor may be disposed in a casing having inlet and outlet apertures. Alternatively the second rotor may be free standing, that is without any casing. One or more further second rotors may be provided as convenient.

The rotor may preferably include 2 to 6 radially extending blades, more preferably 3 such blades. The blades may be laminar, extending axially of the rotor. Alternatively the blades may be curved or arranged in parallel arrays in a herringbone configuration. The blades are preferably parallel.

Preferred apparatus further comprises an electrostatic charging head. Preferably there is also provided means for providing a predetermined supply of powdered flavoring to said inlet.

In embodiments wherein the screw and rotor are coaxial the rotor is preferably integral with the screw conveyor. Rotation of the rotor and screw conveyor is preferably arranged so that rotation of the paddle ejects powder at a velocity sufficient to cause it to pass through the electrostatic field.

The rotor may be arranged to be driven at the same speed as the screw conveyor but is preferably driven at a higher speed to ensure efficient dispersal of the flavoring into the electrostatic field. A lower rotational speed for the screw conveyor is preferred to reduce degradation or caramelization of the flavoring due to heating of the screw conveyor.

Location of the rotor alongside the downstream end of the screw conveyor has advantages that the length of the apparatus is minimized. Powdered flavoring is discharged from the, screw conveyor along the full length of the rotor and the rotational speed of the rotor relative to the screw conveyor may be adjusted as desired.

Use of the method and apparatus of this invention confers many advantages. Use of electrostatic deposition enhances the application of the flavoring to the food product. No airborne flow of flavoring is created. The application of charge to the powdered flavoring has the advantage that any flavoring which becomes dislodged from the food product or which is not securely attached to it retains its charge and can be picked up by contact with further food product.

The food products may be disposed or arranged to pass through an inclined rotating drum so that they tumble past the supply of charged flavoring.

Rotation of the rotor at high speed, for example 300 to 1750 rpm allows the dispenser to be controlled to accurately respond to any variation in the volume or amount of material applied at the inlet.

The outlet from the chamber may comprise a multiplicity of slots which may have the same or different dimensions as convenient.

The invention finds particular application in "on machine flavoring". "On machine flavoring" in contrast to "on line flavoring" refers to application of the flavoring to the product using apparatus attached directly to the weighing apparatus. This greatly facilitates commercial production of food products. Use of the apparatus in accordance with this invention can result in a 20% saving of flavoring material and can overcome any necessity to stop production hourly to clean the automatic weighing machine.

The invention may further provide foodstuff flavoring apparatus comprising a vessel through which foodstuff can pass during manufacture, an electrostatic charging head disposed in said vessel and a dispenser in accordance with a preceding aspect of this invention arranged so that flavoring ejected from said outlet passes adjacent the electrostatic charging head to induce an electrostatic charge thereon. The vessel may comprise a drum or other chamber, for example including an endless belt.

Preferred apparatus comprises a flavoring drum wherein flavoring is applied to a foodstuff; a detector arranged to generate a signal indicative of the amount of foodstuff passing through the drum in use; a feeder responsive to said signal adapted to release a controlled amount of flavoring to the screw conveyor of the dispenser to apply flavoring to the foodstuff in the drum to provide a flavored foodstuff incorporating a predetermined amount of flavoring. The detector may comprise a weighing cell, mass flow monitoring system, optical imaging system or other detector known to those skilled in the art.

The drum is preferably arranged to rotate in use. In preferred embodiments of the invention the chamber of the dispenser is adjustable so that the angular disposition of the outlet relative to the drum may be controlled. This allows the flavoring ejected from the dispenser to be directed towards the foodstuff bed within the drum, minimizing wastage.

The apparatus provides a controllable system which is responsive to variations in the amount and composition of the foodstuff. For example in preparation of potato chips the moisture content of the potatoes employed may vary. When they are fried the moisture is replaced with oil so that the oil levels in the product resultant from the frier may vary. In practice the frying time may be varied to compensate for oil variation. This results in variation in product through-put. The present invention can accommodate such variations maintaining a consistent level of application of flavoring. A rapid response to any variation in-product through-put is important. In preferred embodiments of the invention the velocity of the screw conveyor is constant and is maintained to afford a high through-put. The delivery of flavoring from the feeder can then be modulated to control the amount of flavoring applied.

BRIEF DESCRIPTION OF THE DRAWINGS

The invention is further described by means of example but not in any limitative sense with reference to the accompanying drawings, of which.

DESCRIPTION OF THE PREFERRED EMBODIMENTS

Figure 1:
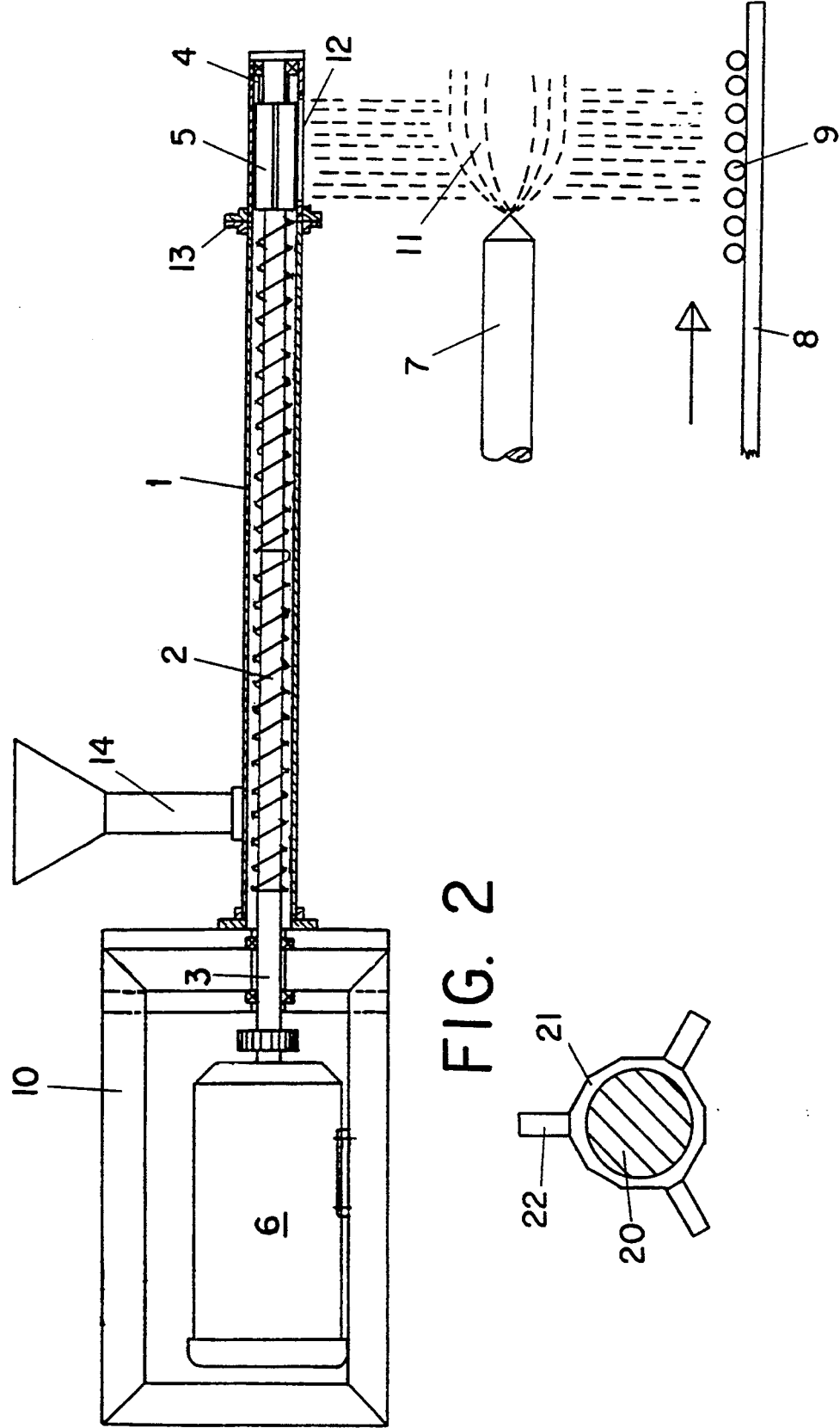
FIG. 1 is a cross sectional view of a dispenser in accordance with this invention.

The apparatus in FIG. 1 comprises a cylindrical barrel 1 containing a screw conveyor 2 mounted on the shaft 3. A rotor 5 coaxial with and integrally connected to the screw conveyor 2 is contained within a cylindrical chamber 4 and is sealed to the barrel 1 by means of an adjustable flange 13. The flange allows the orientation of the chamber to be adjusted without rotation of the whole dispenser so that the direction of the flow of flavoring may be controlled to eliminate variations in operating conditions. The rotor 5 incorporates three radially extending paddles which are directed towards the wall of the chamber 4 and preferably brush against it as the rotor is turned. An outlet defined by an axial slot 12 or alternatively an array of slots arranged in axially spaced relation along one side of the chamber 4, is directed towards one or more electrostatic charging heads 7 arranged to generate an electric field 11. A motor 6 having a dynamic brake is mounted on a support 10 to cause rotation of the shaft 3, conveyor 2 and rotor 5. Food products 9 disposed within a rotating drum or carried on a conveyor 8 are located beyond the charging region 11 so that charged-flavoring falls onto the products 9.

In alternative embodiments of the invention a plurality of slots may extend axially along the wall of the chamber 4. The slot 12 or slots may have parallel sides providing a constant width. In a further embodiment the sides of a slot or slots may diverge in a direction away from the screw feed to facilitate even spatial distribution of flavoring into the electrostatic field.

Powdered flavoring applied to the inlet 14 of the screw conveyor 2, for example from a conventional flavoring metering apparatus (not shown) is carried by rotation of the screw conveyor 2 to the chamber 4. Rotation of the rotor 5 causes the flavoring material to be ejected from the slot 12, through the electrostatic charging region 11 and onto the food product 9.

The electrostatic charging head 7 preferably includes an integral power supply. This serves to avoid a necessity for HT lines external of the apparatus. Conventional HT lines employ aqueous copper sulphate-containing conductors. These afford a toxicity hazard when cut and there is a risk of the conductor freezing in cold conditions. The present invention allows use of a 24 volt or other low voltage supply.

In preferred embodiments of the invention, the chamber 4 may be adjustably rotatable at the flange 13 to allow the slots 12 to be positioned to compensate for changes in the location of the product bed caused by variations in the speed and direction of rotation of either the rotor 5 or of a flavoring drum (not shown). When the drum rotates, the position of the bed of foodstuff in the drum varies dependent on the rate of rotation, direction of rotation, size and weight of the foodstuff. Adjustment of the direction of ejection of the flavoring from the dispenser minimizes wastage.

Figure 2:
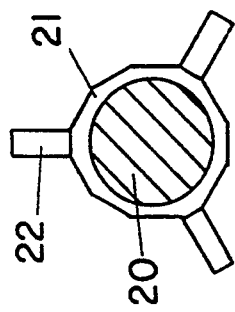
FIG. 2 is an end elevation of a rotor for use in the apparatus as shown in FIG. 1.

FIG. 2 is an end elevation showing the construction of a preferred rotor which comprises a body 21 and three radial projections or paddles 22 disposed on a shaft 20.

The screw conveyor 2 and barrel 1 may be composed of stainless steel or like metal although the chamber 4 and rotor 5 are preferably composed of insulating plastic material, for example acetyl resin.

Charging head 7 may be arranged to charge at any convenient voltage, for example 90 KVA negative charge, the product being at ground potential.

The conveyor 8 may comprise a tumble drum arranged to deliver the product to a dedicated, integral weigh head for dispensing precise quantities of product to a bag forming apparatus.

The screw conveyor and rotor may be driven by a motor, attached to the shaft 3 either directly or using a toothed belt or other coupling. A motor having a dynamic brake to prevent overrun is preferred. This allows the apparatus to be precisely controlled to regulate the quantity of flavoring applied to the food product.

Figure 3:
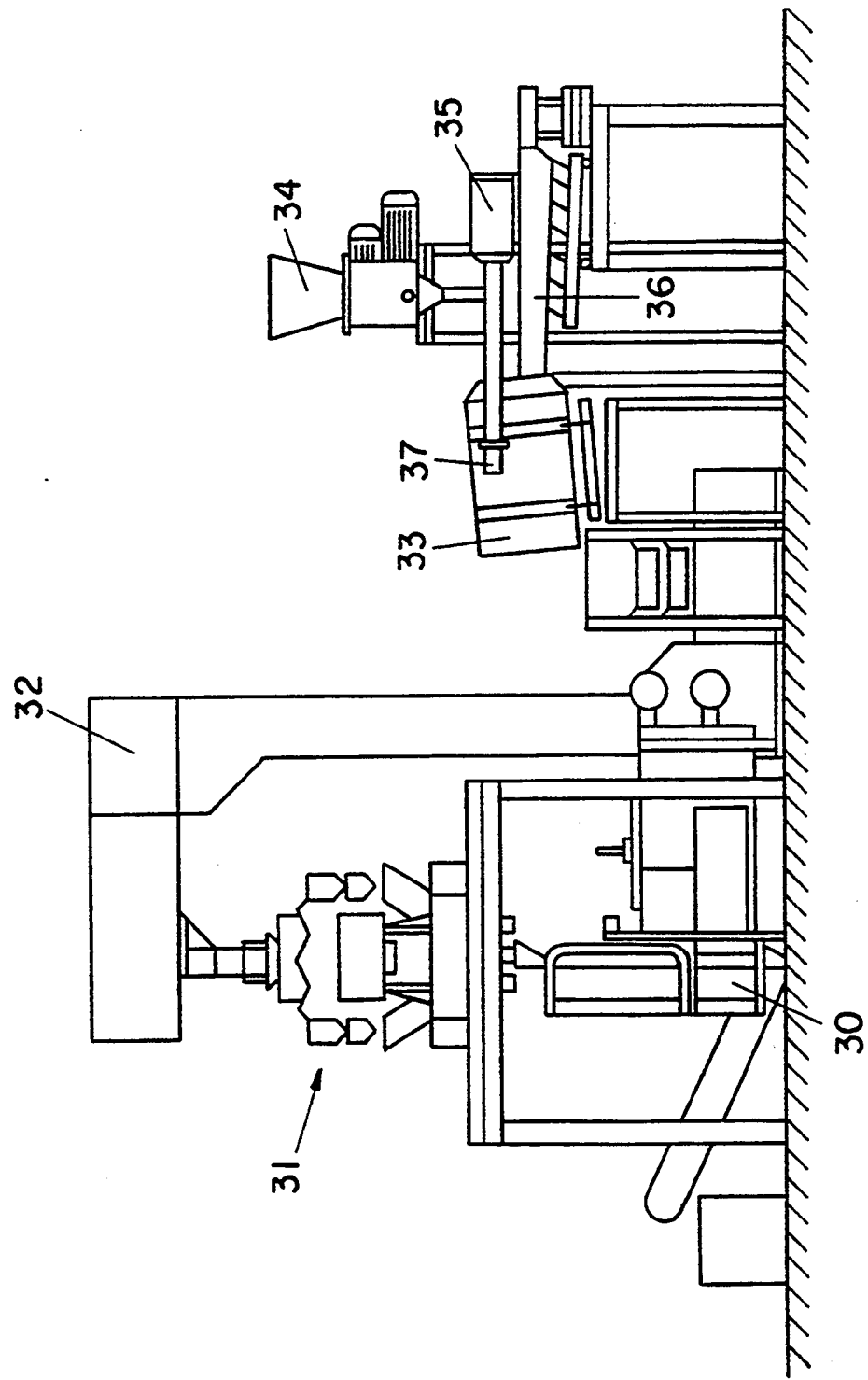
FIG. 3 is a side elevation of a typical snack foods production line incorporating apparatus in accordance with this invention.

FIG. 3 illustrates a typical snack food production line incorporating an electrostatic dispenser in accordance with the present invention. A supply of food products from an infeed conveyor or chute 36 leads to a flavor drum 33. The drum 33 is arranged to rotate to cause mixing of the flavoring and food product. A bucket elevator 32 carries the flavored food product to a weighing machine 31 and bag maker 30. An electrostatic dispenser 35 in accordance with the embodiment described with reference to FIG. 1, supplied by a volumetric feeder 34, incorporates a plurality of outlet slots 37 through which powdered flavoring is released to an electrostatic head (not shown) within the drum 33. The electrostatic dispenser is conveniently inserted into the drum above the food product.

The arrangement confers several advantages over prior art arrangements. Flavoring is usually added to the food product as a percentage of the weight of the latter. The rate of feed of the flavoring into the drum 33 is controlled to take account of variations in the quantity of the food product. The weight of food product is usually measured by means of a weighing cell (not shown) situated immediately prior to the flavoring drum, or by use of a mass flow monitoring system on the infeed conveyor or infeed chute. The rate of supply of a volumetric feeder 34 is preferably dependent on signals from the weighing cell indicative of the weight of unflavored product supplied to the drum.

As an alternative to using a weighing cell or mass flow monitoring system, an on line full color optical image and sorting process system may be installed immediately after the flavor drum. In this case by optically scanning the flavored product and detecting color variation a signal is sent to the volumetric feeder 34 to vary the rate at which the flavoring is dispensed to the electrostatic applicator. The optical equipment should be preset to given shade parameters to directly reflect the required flavor level. Should any of the flavored product deviate from the specification an automatic defect removal unit would reject the product thus enhancing overall quality of the flavored products.

The screw of the flavoring dispenser preferably runs at a constant high speed so that it may cope with any rate of flavoring material supplied to it. The flavoring material is dispensed rapidly by the screw feed and is arranged to arrive within the drum 33 simultaneously with the arrival of the food product from the weighing cell. Accurate levels of supply of the flavoring and uniform dispersion of it without formation of flavor agglomerates are achieved. Adhesion of the flavoring to the foodstuff is enhanced reducing the incidence of formation of deposits on the weighing machine and fouling of the bags formed by the bag maker 30.

Figure 4:
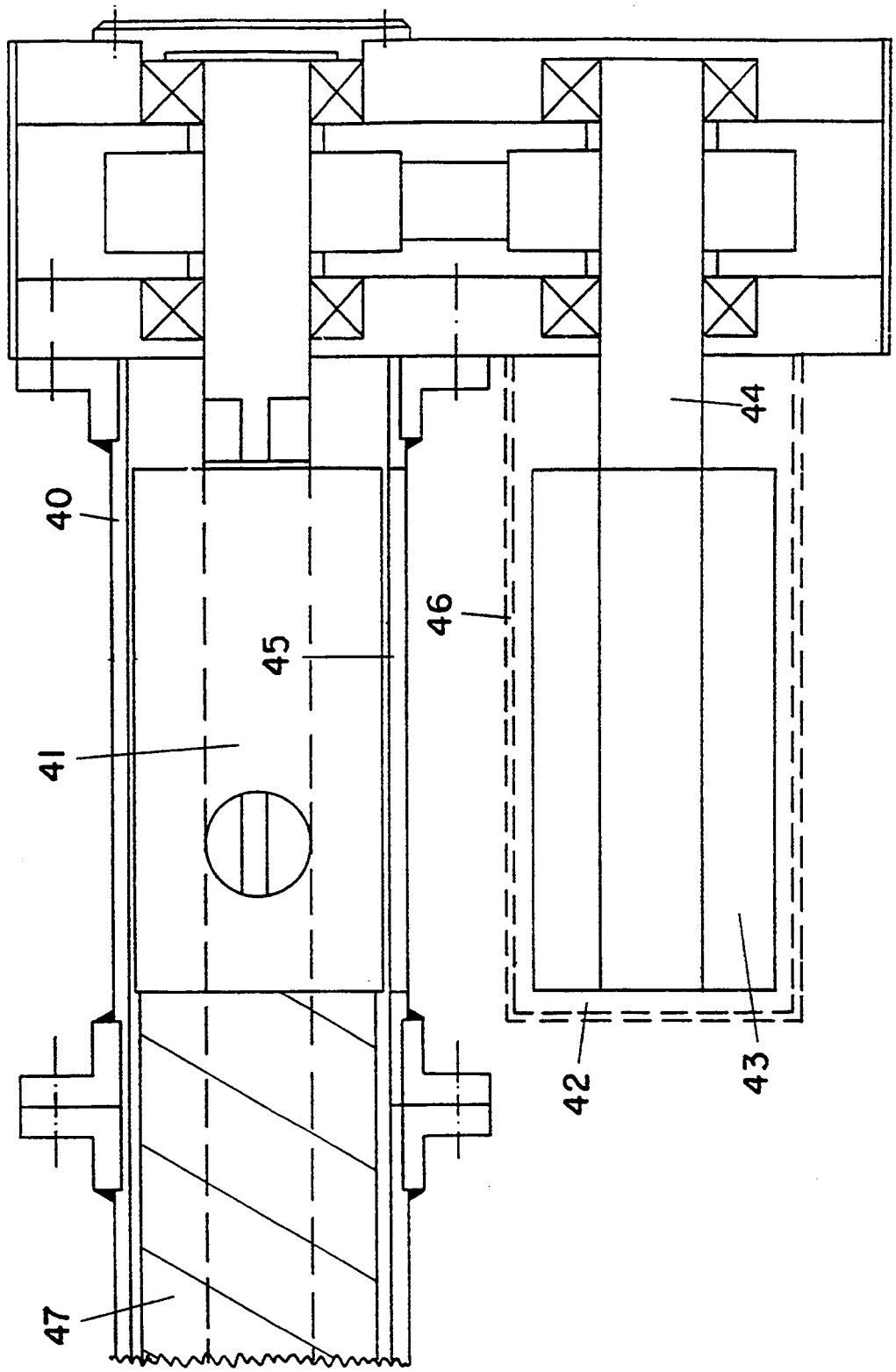
FIG. 4 is a cross sectional view of an alternative dispenser.

FIG. 4 is a cross sectional view of an alternative apparatus in accordance with this invention. A barrel 40 carries a screw conveyor 47 mounted on a rotatable shaft. A first rotor 41 integral with the screw conveyor delivers flavoring through an axially extending aperture 45 to a second, lower rotor 43. The second rotor 43 mounted on an axle 44 is arranged for rotation parallel to the first rotor 41 adjacent the downstream end of the screw 47. Gears disposed on the axles 41, 44 respectively drive the rotor 43 as the screw 47 turns. The relative speed of the rotor 43 may be adjusted by selection of appropriately sized gears. Casing 46 which is optional, has inlet and outlet apertures to allow the flow of flavoring to be directed toward the foodstuff. Flavoring passing from the aperture 45 at the end of the screw 47 falls into the inlet 46 of the cylinder chamber 42. The rotor 43 causes the flavoring to be ejected by rotation of the rotor into the vicinity of the charging head, as described with reference to FIG. 1.

The apparatus may be used for application of a wide variety of flavorings onto various foodstuffs. Flavorings may include vitamins or salt and other nutrients. Foodstuffs may be for human or animal consumption. Coatings may be applied during manufacture of battered or breadcrumbed products. This avoids the need for impregnation of batter or breadcrumb coatings before frying with resultant contamination to the frying oils.

Figure 5:
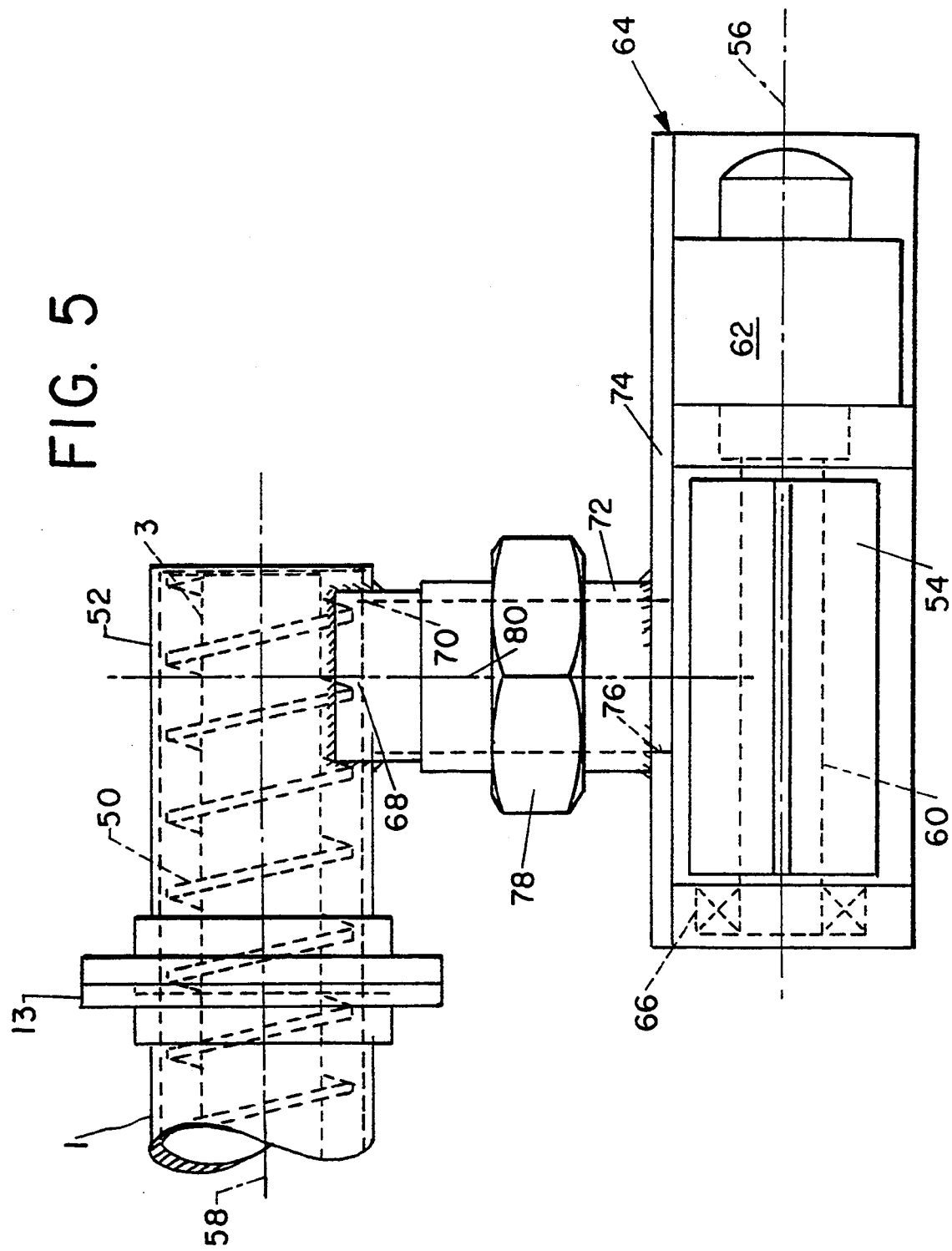
FIG. 5 is a fragmentary front elevational view of another alternative embodiment of a dispenser in accordance with the invention.
Figure 6:
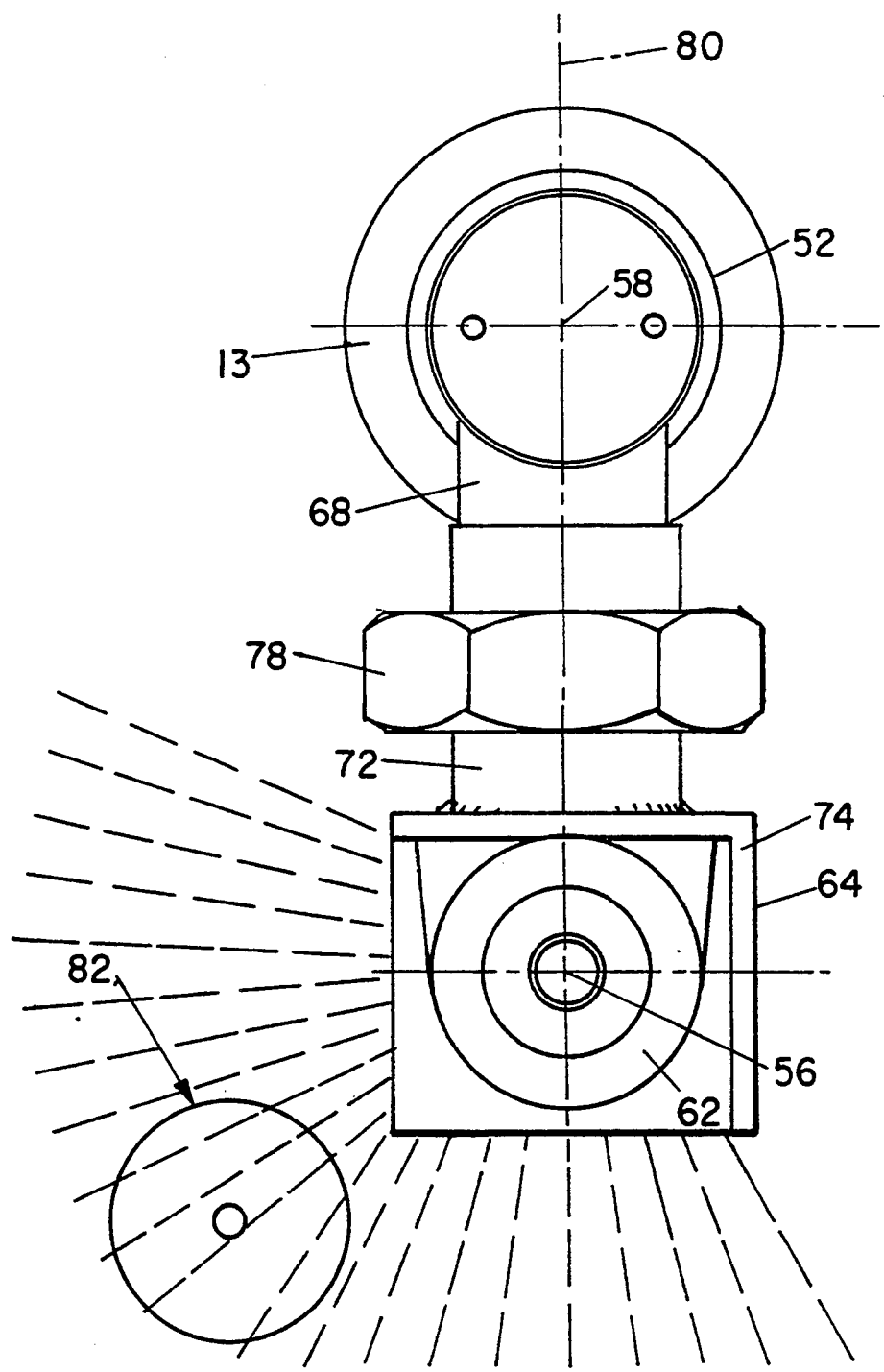
FIG. 6 is a right side view of the dispenser of FIG. 5.

An alternative embodiment of a dispenser in accordance with the invention is illustrated in FIGS. 5 and 6. This dispenser is similar to that illustrated in FIG. 1, that is, from the drive motor 6 through the adjustable flange 13. The many variations, in sensing and controlling an operation adding flavoring to foodstuffs, that are described with regard to the embodiments of FIGS. 1 and 4, and were also described in the parent application Ser. No. 07/923,419, are also applicable to the embodiment of FIGS. 5 and 6.

In FIGS. 5 and 6, a screw conveyor 50 extends beyond the cylindrical barrel 1 and adjustable flange 13 into a chamber 52 that is substantially a cylindrical extension of the barrel 1. A rotor 54, similar to the rotor 5 of FIG. 1, is mounted on shaft 60 for rotation about an axis 56 that is located below and parallel to the axis 58 of the screw conveyor 50, at least when viewed in elevation as in FIG. 5. The rotor 54 extends from a motor 62, which is mounted to a rotor housing, or housing 64. A bearing 66, integrally mounted in the housing 64, supports the end of the shaft 60 which is spaced from the motor 62. The housing 64 is a right angle member that partially encloses both the motor 62 and the rotor 64 from above and one side.

A tube 68 extends outwardly from the wall of the chamber 52 and connects to the chamber interior through an opening 70 in the chamber wall. A tube 72 extends from the upper wall 74 of the housing 64, and an opening 76 in the upper wall 74 provides access to the rotor 54 from the tube 72. The tube 68 is telescopically and rotatably slidable in the tube 72. Thus, the combined length of the tubings 68, 72, that is, the distance between the screw conveyor axis 58 and the motor axis 56, can be determined by telescopic adjustment of the two tubes 68, 72 and locking at a desired position by means of a holding nut 78, in a known manner. Housing 64 supporting therein the rotor 54 and its drive motor 62 is in turn rotatably supported from the housing of chamber 52 by the tubing 68.

FIG. 6 illustrates the axes 56, 58 in a parallel relationship. However, it should be understood that the entire housing/rotor/motor assembly 64, 54, 62 can be rotated about the axis 80 of the telescoped tubes 68, 72 so as to be positioned at any desired angular position, as the related processing equipment and product require. An electrostatic charging head 82 is located close to the open sides of housing 64 so as to face the interior of the housing 64, that is, there is no obstruction between the electrostatic head 82 and the rotor 54.

In operation, flavoring, or any other material that is to be distributed, moves along the screw conveyor 50, as described in the previous embodiments, and enters the chamber 52. There, the flavoring material falls through the opening 70 that connects the chamber 52 to the transfer conduit comprised of the telescoped tubes 68, 72. Flavoring material dropping through the conduit, drops through the opening 76 in the housing 64, and onto the rotor 54. The rotor 54 is driven in rotation by the motor 62. Because the motor 62 is mechanically entirely independent of the motor (not shown in FIGS. 5, 6) that drives the screw conveyor 50, each motor may be operated at an optimum speed for the materials that are being transported and distributed.

The flavoring material falls from the transfer conduit 68, 72 onto the moving rotor 54 and is ejected with velocity, generally moving radially away from the axis 56, as illustrated by the broken lines radiating with a semi-sunburst pattern in FIG. 6. The projected particles come under the influence of the electrostatic charging head 82, which is located near the rotor assembly in the path of the flavoring being discharged. The particles become charged on their respective paths to an encounter with the foodstuffs that are moving, for example, on an adjacent conveyor belt, as described above. The right angle shape of the housing 64 prevents omni-directional distribution of the flavoring (FIG. 6). It should be apparent that differently shaped housing may be used to expand or limit the dispersion pattern of flavoring by obstructing more or less of the rotor. Wastage of flavoring is thus reduced.

The embodiment of FIGS. 5 and 6 has many advantages in that the speed of the rotor motor 62 and that of the screw conveyor can be independently and easily controlled without necessitating gearing changes and the speed of the rotor may be dramatically increased with respect to the speed of the screw conveyor.

Further, the rotor 54 can be oriented and fixed in a 360° range about the axis 80 of the connecting tubes 68, 72 by adjustments at the holding nut 78, and the chamber opening 70 can be given different angular orientations relative to the conveyor's axis 58 by adjustment at the flange 13. Thus, a universal degree of adjustment is available in positioning and orienting the distribution rotor 54 in relation to other elements, as will optimize the processing of a product.

Use of the closed transfer conduit between the conveyor and the rotor reduces airborne dust that contaminates the dispenser and related equipment and is an annoyance to personnel.

The rotor can operate at high speeds while the screw conveyor may be rotated at a substantially slower rate to avoid heating of the flavoring during transport by the screw conveyor. A variable speed drive is preferred for the screw conveyor, and an air motor, or other type of motor allowing speed control, may be used for the rotor.

It will thus be seen that the objects set forth above and those made apparent from the preceding description, are efficiently attained and, since certain changes may be made in the above constructions without departing from the spirit or the scope of the invention, it is intended that all matter contained in the above description, or shown in the accompanying drawings, shall be interpreted as illustrative and not in a limiting sense.

What is claimed is:

1. A foodstuffs flavoring dispenser, comprising:
   a screw conveyor in a cylindrical barrel for conveying flavoring from an inlet end to an outlet end of said conveyor;
   first motor means for rotating said screw conveyor;
   a rotor means positioned below said conveyor outlet end for ejecting flavoring; and
   second motor means for independently rotating said rotor;
   a transfer conduit having opposite ends, said conduit being positioned between said barrel and said rotor, said barrel having a first opening therein at said conveyor outlet end, one said conduit end communicating with said first barrel opening, whereby flavoring conveyed to said outlet end by said screw conveyor is discharged through said first opening and through said conduit to engage said rotor.

2. A foodstuffs flavoring dispenser as in claim 1, wherein said one end of said conduit is connected to said barrel at said barrel opening.

3. A foodstuffs flavoring dispenser as in claim 1, further comprising a housing, said housing partially surrounding said rotor.

4. A foodstuffs flavoring dispenser as in claim 3, wherein said housing includes an opening located above said rotor, the other said end of said conduit communicating with said opening.

5. A foodstuffs flavoring dispenser as in claim 4, wherein said conduit is connected to said housing at said housing opening.

6. A foodstuffs flavoring dispenser as in claim 1, wherein said rotor includes 2 to 6 radially extending blades.

7. A foodstuffs flavoring dispenser as in claim 1, further comprising means for adjusting the angular orientiation of said barrel opening relative to said conveyor axis.

8. A foodstuffs flavoring dispenser as in claim 1, further comprising an electrostatic charging head disposed in proximity to said rotor, whereby flavoring, which is distributed by said rotor in operation passes adjacent to said electrostatic charging head to induce and electrostatic charge thereon.

9. A foodstuffs flavoring dispenser as in claim 3, wherein said rotor motor is mounted to said housing.

10. A foodstuffs flavoring dispenser as in claim 3, wherein said transfer conduit includes rotatable connecting and support means for adjustably rotationally supporting said rotor from said outlet end of said barrel.

11. A foodstuffs flavoring dispenser, comprising:
a screw conveyor in a cylindrical barrel for conveying flavoring from an inlet end to an outlet end of said conveyor, said conveyor having a longitudinal axis;
first motor means for rotating said screw conveyor;
a rotor positioned below said conveyor outlet end, said rotor having a longitudinal axis;
second motor means for rotating said rotor;
a housing means for partially enclosing said rotor, said housing means having a top wall having a second opening located above said rotor;
a conduit having a pair of ends and being positioned between said barrel and said rotor, said barrel having a first opening therein at said conveyor outlet end, one said conduit end communicating with said first barrel opening and connected to said barrel, the other conduit end communicating with said housing means opening and connected to said housing means,
whereby flavoring, conveyed to said outlet end by said conveyer, is discharged through said barrel opening, through said conduit and through said housing means opening toward said rotor.

12. A foodstuffs flavoring dispenser as in claim 11, wherein said conduit comprises rotatable support means for rotatably adjustably supporting said rotor housing means from said barrel.

13. A foodstuffs flavoring dispenser as in claim 11, wherein said first motor means and said second motor means are mechanically independent of each other.

14. A foodstuffs flavoring dispenser as in claim 13, wherein said first and second motor means include variable speed motors.

15. A foodstuffs flavoring dispenser as in claim 11, wherein said conduit includes a first tube connected to said barrel and a second tube connected to said housing means, said first tube and said second tube being telescopically engaged and rotatable relative to each other about a common axis, said rotor axis being fixed relative to said housing, whereby said rotor is rotatable relative to said conveyor about said common axis when said second tube is rotated relative to said first tube.

16. A foodstuffs flavoring dispenser as in claim 15, further comprising means for releasably holding said first tube and said second tube in a selected rotated and telescoped position to form said conduit.

17. A foodstuffs flavoring dispenser as in claim 11, wherein said rotor is mounted to said housing.

18. A foodstuffs flavoring dispenser as in claim 15, wherein said rotor is rotatable through 360° around said common axis.

19. A foodstuffs flavoring dispenser as in claim 11, further comprising means for adjusting the angular orientation of said barrel opening relative to said conveyor axis.

20. A foodstuffs flavoring dispenser as in claim 11, wherein said housing shields at least two sides of said rotor, the pattern of distribution of flavoring by said rotor in operation being determined in part by contours of said housing.

* * * * *